(12) United States Patent
Woo et al.

(10) Patent No.: US 10,727,526 B2
(45) Date of Patent: Jul. 28, 2020

(54) SECONDARY BATTERY

(71) Applicant: SAMSUNG SDI CO., LTD., Yongin-si, Gyeonggi-do (KR)

(72) Inventors: Byongchul Woo, Yongin-si (KR); Jekwang Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 117 days.

(21) Appl. No.: 14/964,601

(22) Filed: Dec. 10, 2015

(65) Prior Publication Data
US 2016/0285070 A1 Sep. 29, 2016

(30) Foreign Application Priority Data

Mar. 26, 2015 (KR) .................. 10-2015-0042395

(51) Int. Cl.
*H01M 10/04* (2006.01)
*H01M 2/22* (2006.01)
*H01M 4/38* (2006.01)
*H01M 4/583* (2010.01)
*H01M 10/0587* (2010.01)

(52) U.S. Cl.
CPC ......... *H01M 10/0431* (2013.01); *H01M 2/22* (2013.01); *H01M 4/386* (2013.01); *H01M 4/583* (2013.01); *H01M 10/0587* (2013.01); *H01M 2220/20* (2013.01); *H01M 2220/30* (2013.01)

(58) Field of Classification Search
CPC ............... H01M 10/0431; H01M 2/22; H01M 10/0587; H01M 4/386; H01M 4/583
USPC ....................................................... 429/211
See application file for complete search history.

(56) References Cited

U.S. PATENT DOCUMENTS

| 8,889,286 | B2 | 11/2014 | Jo et al. |
| 9,564,654 | B2 | 2/2017 | Wang et al. |
| 2010/0330427 | A1* | 12/2010 | Kogetsu ............. H01M 2/22 429/220 |
| 2011/0081574 | A1* | 4/2011 | Jo .................... H01M 2/263 429/211 |
| 2013/0252054 | A1 | 9/2013 | Barone et al. |
| 2014/0120397 | A1 | 5/2014 | Kim et al. |

(Continued)

FOREIGN PATENT DOCUMENTS

| CN | 101960653 A | 1/2011 |
| CN | 102035013 A | 4/2011 |

(Continued)

OTHER PUBLICATIONS

Chinese Office Action dated Feb. 3, 2019.

(Continued)

*Primary Examiner* — Jonathan G Jelsma
(74) *Attorney, Agent, or Firm* — Lee IP Law, P.C.

(57) ABSTRACT

A secondary battery, including an electrode assembly, the electrode assembly including a pair of electrodes having opposite polarities, and a separator between the pair of electrodes; and at least one electrode tab electrically connected to one of the pair of electrodes, the at least one electrode tab extending outside of the electrode assembly, the electrode assembly further including a buffer layer on the electrode to which the at least one electrode tab is electrically connected, the buffer layer at least partially overlapping a region in which the electrode is connected to the electrode tab.

12 Claims, 17 Drawing Sheets

(56) References Cited

U.S. PATENT DOCUMENTS

| | | | | |
|---|---|---|---|---|
| 2014/0141338 A1* | 5/2014 | Kim | ............... | H01M 10/0431 |
| | | | | 429/246 |
| 2014/0315061 A1* | 10/2014 | Wang | ............... | H01M 10/0431 |
| | | | | 429/94 |
| 2015/0140442 A1* | 5/2015 | Cyman, Jr. | ............ | C09J 133/14 |
| | | | | 429/317 |

FOREIGN PATENT DOCUMENTS

| CN | 104332647 A | 2/2015 |
|---|---|---|
| JP | 2006-260904 A | 9/2006 |
| KR | 20-2000-0006811 U | 4/2000 |
| KR | 2011-0036499 A | 4/2011 |
| KR | 10-2011-0137905 A | 12/2011 |
| KR | 10-2013-0108387 A | 10/2013 |
| KR | 10-2013-0135129 A | 12/2013 |

OTHER PUBLICATIONS

Chinese Office action dated Oct. 30, 2019.
Korean Office Action issued by the Korean Industrial Property Office dated Mar. 20, 2018 in the examination of Korean Patent Application No. 10-2015-42395.

* cited by examiner

SECONDARY BATTERY

CROSS-REFERENCE TO RELATED APPLICATION

Korean Patent Application No. 10-2015-0042395, filed on Mar. 26, 2015, in the Korean Intellectual Property Office, and entitled: "Secondary Battery," is incorporated by reference herein in its entirety.

BACKGROUND

1. Field

Embodiments relate to a secondary battery.

2. Description of the Related Art

A secondary battery is a battery that may be capable of being charged and discharged, and may be repeatedly used. A secondary battery may be charged by using new and renewable energy such as solar energy, as well as an existing electric power system such as a power plant. A secondary battery may be used as an energy source in automobiles or large facilities requiring power supply, as well as in electronic devices such as a portable phone, a notebook computer, and a camcorder.

To implement a high output and high capacity secondary battery, a plurality of unit batteries may be serially connected and/or may be connected in parallel. A controller for controlling charge and/or discharge of the secondary battery and preventing over-charge and/or over-discharge may be further provided.

SUMMARY

Embodiments may be realized by providing a secondary battery, including an electrode assembly, the electrode assembly including a pair of electrodes having opposite polarities, and a separator between the pair of electrodes; and at least one electrode tab electrically connected to one of the pair of electrodes, the at least one electrode tab extending outside of the electrode assembly, the electrode assembly further including a buffer layer on the electrode to which the at least one electrode tab is electrically connected, the buffer layer at least partially overlapping a region in which the electrode is connected to the electrode tab.

The electrode tab may include a tab overlapping portion overlapping a connected electrode; and a tab extending portion extending from the tab overlapping portion to outside of the electrode assembly. The buffer layer may at least partially overlap an edge of the tab overlapping portion.

The buffer layer may overlap a longitudinal end of the tab overlapping portion.

The buffer layer may overlap an end in a width direction of the tab overlapping portion.

The buffer layer may extend from the edge of the tab overlapping portion and may further overlap an edge of an active material layer of the electrode.

The buffer layer may be between the electrode to which the electrode tab is connected and the electrode tab or may be on an opposite side to the electrode tab on the electrode to which the electrode tab is connected.

A welding region connected to the electrode may be in at least a part of the electrode tab, and the buffer layer may be by the welding region between the electrode tab and the electrode.

In the buffer layer, a through hole may be in a portion in which the buffer layer overlaps the electrode tab, and the electrode tab and the electrode may be connected via the through hole.

A welding region connected to the electrode may be in at least a part of the electrode tab, and the buffer layer may be on the opposite side to the electrode tab so as to overlap the welding region.

The secondary battery may further include an adhesive layer between the electrode with the buffer layer and the buffer layer. The adhesive layer may overlap at least a part of the buffer layer.

The adhesive layer may have conductivity.

The secondary battery may further include a cover layer on the electrode so as to cover the buffer layer.

The cover layer may include an insulating tape.

The buffer layer may include a polymer base layer or a metal base layer.

One of the pair of electrodes may include at least one of graphite and silicon.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
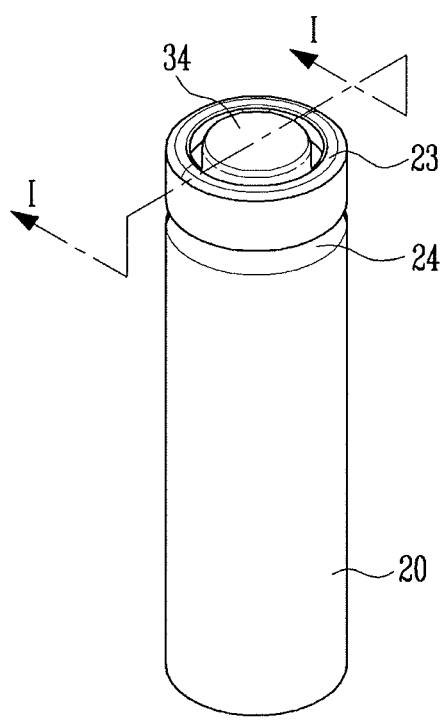
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Throughout this specification and the claims that follow, when it is described that an element is "coupled" to another element, the element may be "directly coupled" to the other element or "electrically coupled" to the other element through a third element. In the accompanying drawings, a portion irrelevant to a description of embodiments will be omitted for clarity. Like reference numerals refer to like elements throughout.

A secondary battery disclosed herein may be a battery having any configuration that may be charged and discharged. In the accompanying drawings, the scope of embodiments is illustrated as being applied to a roll-type electrode assembly. However, the scope of embodiments may be applied to a stack-type electrode assembly. In the stack-type electrode assembly, a positive electrode, a separator, and a negative electrode may be sequentially stacked. A plurality of positive electrodes, separators, and negative electrodes may be provided.

Figure 2:
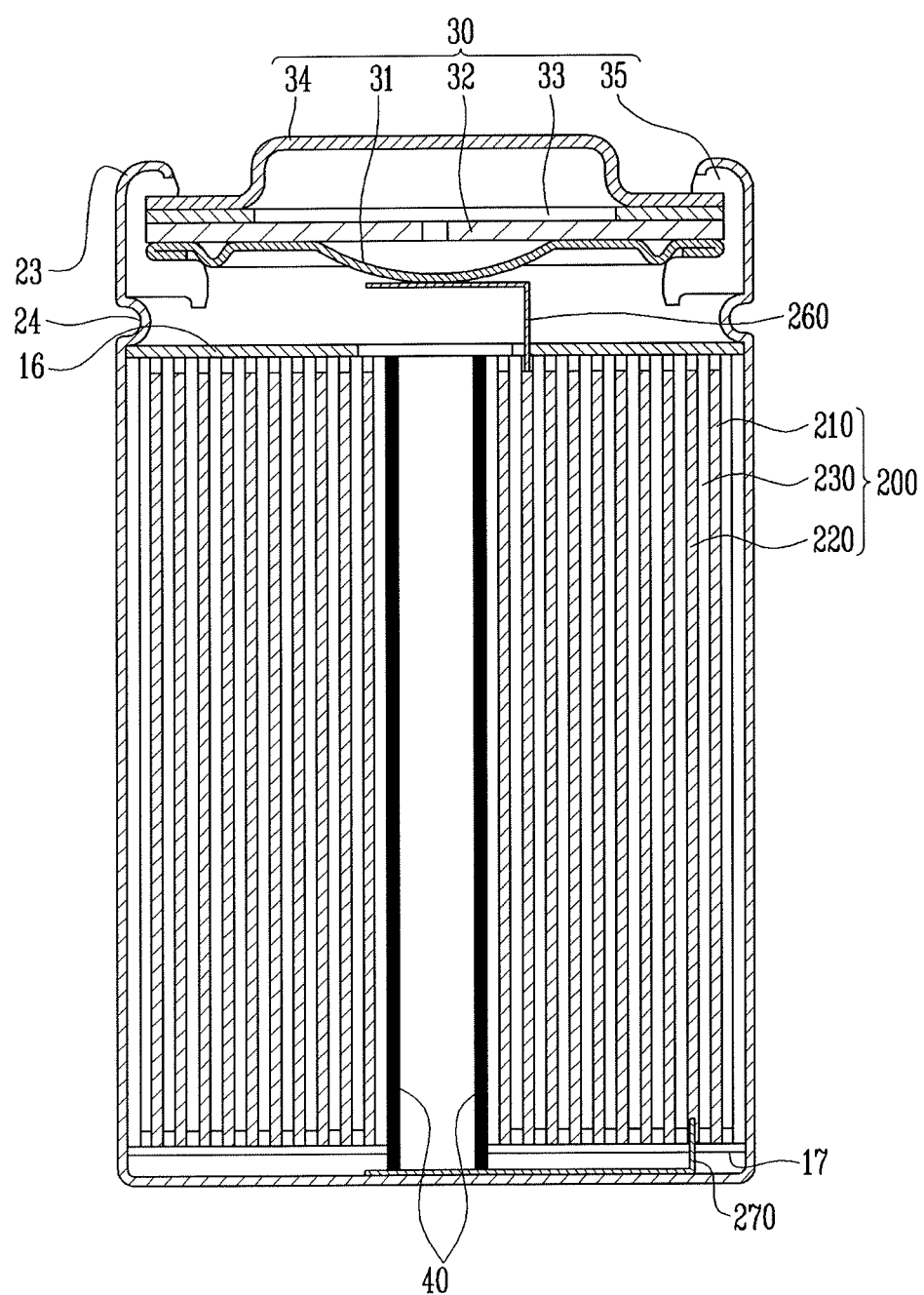
FIG. 2 illustrates a cross-sectional view taken along the line I-I of FIG. 1.
Figure 3:
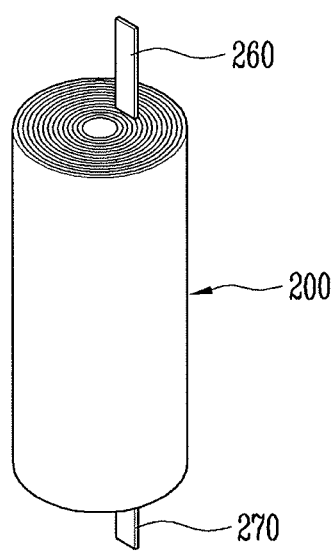
FIG. 3 illustrates a perspective view of an embodiment of the electrode assembly of FIG. 2.

FIG. 1 illustrates a perspective view of a secondary battery according to an embodiment. FIG. 2 illustrates a cross-sectional view taken along the line I-I of FIG. 1. FIG. 3 illustrates a perspective view of an embodiment of the electrode assembly of FIG. 2. The secondary battery according to the embodiment may include an electrode assembly 200, at least one electrode tab electrically connected to electrodes of the electrode assembly 200 and extending to the outside of the electrode assembly 200, and a case 20 and 30 for sealing up the electrode assembly 200 together with an electrolyte.

The at least one electrode tab may include a first electrode tab 260 and a second electrode tab 270. The first electrode tab 260 may be electrically connected to a first electrode 210 and the second electrode tab 270 may be electrically connected to a second electrode 220, and energy generated by the electrode assembly 200 may be transmitted to the outside. The first electrode tab 260 and the second electrode tab 270 may include a conductive material, for example, nickel (Ni) or a Ni alloy.

The case 20 and 30 may include a can 20 of which one end may be opened and a cap assembly 30 for sealing up an opening of the can 20. The can 20 may be a cylinder in which a space that accommodates the electrode assembly 200 may be formed. The second electrode tab 270 may be welded to a bottom surface of the can 20, and the can 20 may function as an electrode terminal. The can 20 may be formed of, for example, stainless steel, aluminium, or an equivalent thereof.

Insulating members 16 and 17 may respectively be provided on a side on which the electrode assembly 200 may face the opening of the can 20 and on a side on which the electrode assembly 200 may face the bottom surface of the can 20, and it may be possible to prevent unnecessary electrical short from being generated between the electrode assembly 200 and the can 20.

A clamping unit 23 vent inward may be formed at an edge of the opening of the can 20. The clamping unit 23 may press the cap assembly 30 to improve clamping force. The can 20 may include a protrusion 24 convexly formed inward between the opening and the electrode assembly 200. An internal diameter of the protrusion 24 may be smaller than an external diameter of the electrode assembly 200, and the electrode assembly 200 may fixed to the can 20 and may not move.

A center pin 40 may be provided in the center of the electrode assembly 200, and the electrode assembly 200 may be supported and may not get loose. The center pin 40 may be a cylindrical rod in which a hollow may be formed and one end thereof may press the second electrode tab 270, and the second electrode tab 270 may adhere to the can 20.

The cap assembly 30 may be combined with the opening of the can 20 and may include a vent 31, a circuit board 32, a circuit element 33, a cap up 34, and an insulating gasket 35. The first electrode tab 260 may be connected to the vent 31. The circuit element 33 may be mounted on the circuit board 32. The circuit element 33 may include a positive temperature coefficient (PTC) element to which a flow of current may be blocked during over-current. The conductive cap up 34 that may function as the electrode terminal may be provided on the circuit element. A plurality of through holes may be formed in the cap up 34.

The edge adjacent to the can 20 may be surrounded by the insulating gasket 35, the vent 31, the circuit board 32, the circuit element 33, and the cap up 34 may not directly contact the can 20, and a short may be prevented.

Figure 4:
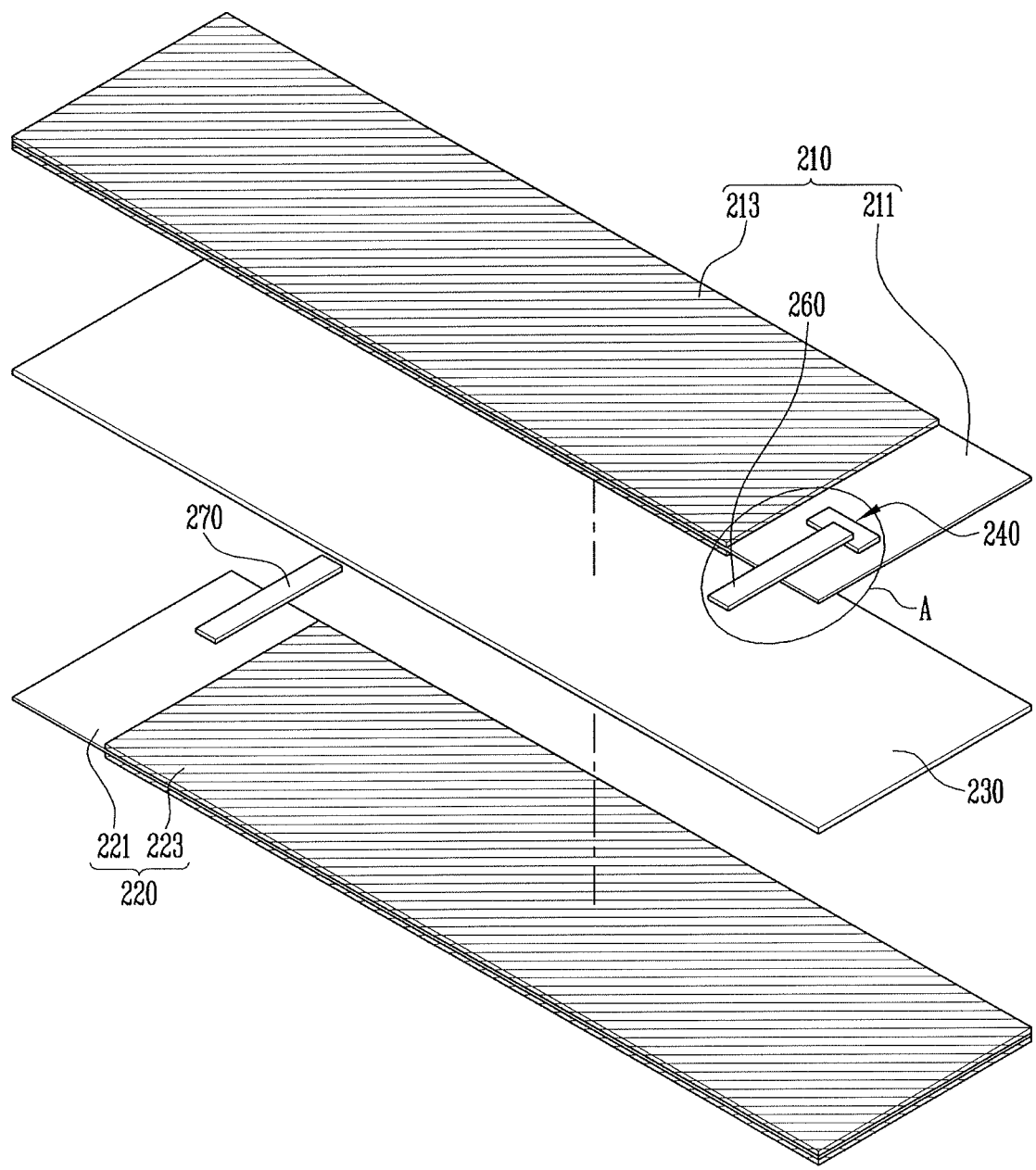
FIG. 4 illustrates an exploded perspective view of a state before the electrode assembly of FIG. 3 is rolled.
Figure 5:
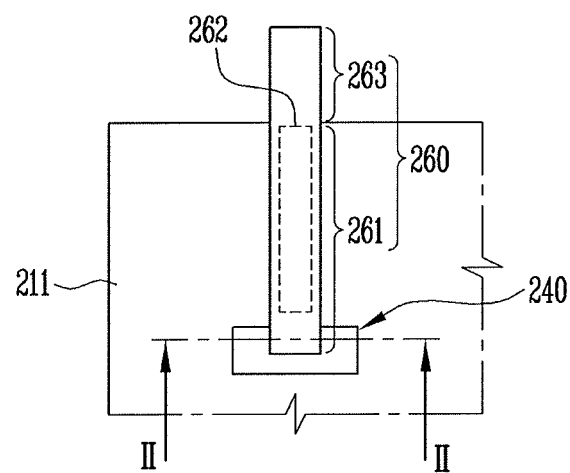
FIG. 5 illustrates an enlarged plan view of the portion A of FIG. 4.
Figure 6:
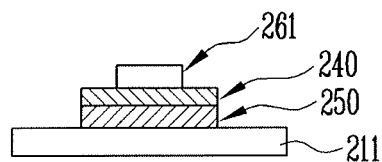
FIG. 6 illustrates a cross-sectional view taken along the line II-II of FIG. 5.

FIG. 4 illustrates an exploded perspective view of a state before the electrode assembly of FIG. 3 is rolled. FIG. 5 illustrates an enlarged plan view of the portion A of FIG. 4. FIG. 6 illustrates a cross-sectional view taken along the line II-II of FIG. 5. Referring to FIGS. 1 to 6, the electrode assembly 200 and at least one electrode tab will be described in detail.

The electrode assembly 200 may include a pair of electrodes 210 and 220 and a separator 230. The separator 230 may be interposed between the pair of electrodes 210 and 220. For convenience sake, in FIG. 4, a state in which the electrode assembly 200 is rolled is illustrated. Referring to FIG. 4, the first electrode 210, the separator 230, and the second electrode 220 may be sheet-shaped and may be sequentially stacked. Polarities of the first electrode 210 and the second electrode 220 may be different from each other. One may be a positive electrode, and the other may be a negative electrode.

The first electrode 210 may include a sheet-shaped first collector 211 and a first active material layer 213 coated on the first collector 211. The first active material layer 213 may be coated on a part of the first collector 211 with a rectangular predetermined area left at longitudinal one end of the first collector 211 as illustrated in FIG. 4. In the first collector 211, in the portion that is not coated with the first active material layer 213, the first electrode tab 260 may be provided.

The position or shape of the portion that is not coated with the first active material layer 213 in the first collector 211 may be modified. For example, the first active material layer 213 may be coated on a remaining portion with a rectangular predetermined area left at one end in a width direction of the first collector 211.

Figure 17:
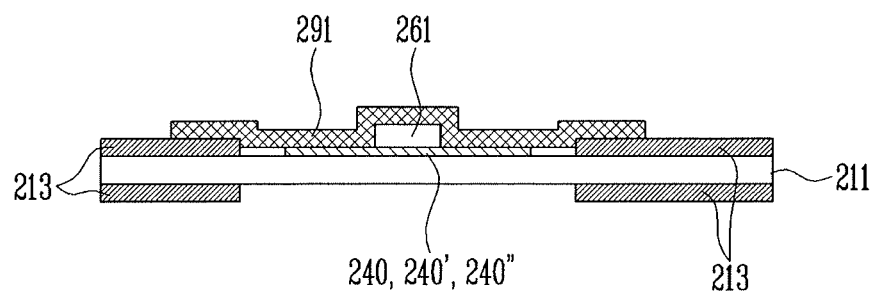
FIG. 17 illustrates a cross-sectional view taken along the line VII-VII of FIG. 16.

The first active material layer 211 may be coated on both sides with a rectangular predetermined area longitudinally left in a center of the first collector 211. The center of the first collector 211 that is not coated with the first active material layer 213 may be arranged to be closer not to the center but to the longitudinal one end. Referring to FIG. 17, the first active material layer 213 may be arranged on both sides of a first non-coated portion and lengths of the first active material layer 213 and the first non-coated portion may not be equal.

The second electrode 220 may include a sheet-shaped second collector 221 and a second active material layer 223 coated on the second collector 221. The second collector 221 may have the same shape as the first collector 211. The second active material layer 223 may be coated on a part of the second collector 221 with a rectangular predetermined area left at longitudinal one end of the second collector 221 as illustrated in FIG. 4. In the second collector 221, in the portion that is not coated with the second active material layer 223, the second electrode tab 270 may be provided.

Referring to FIG. 4, the portion that is not coated with the second active material layer 223 in the second collector 221 may be positioned not to overlap the portion that is not coated with the first active material layer 213 in the first collector 211. Hereinafter, for convenience sake, the portion that is not coated with the first active material layer 213 in the first collector 211 is referred to as the first non-coated portion and the portion that is not coated with the second active material layer 223 in the second collector 221 is referred to as a second non-coated portion.

Referring to FIG. 4, the first non-coated portion may be positioned at the longitudinal one end of the first collector 211 and the second non-coated portion may be positioned at the longitudinal one end of the second collector 221 on an opposite side of the end at which the first non-coated portion is positioned. The positions of the first non-coated portion and the second non-coated portion may be the same or overlap.

The position or shape of the second non-coated portion may be modified. For example, the second active material layer 223 may be coated in a remaining portion with a rectangular predetermined area left at one end of the second collector 221 in a width direction. The second active material layer 223 may be coated on both sides with a rectangular predetermined area longitudinally left in a center of the second collector 221. The center of the first collector 211 that is not coated with the second active material layer 223 may be arranged to be closer not to the center but to the longitudinal one end.

The second active material layer 223 may be coated on both surfaces of the second collector 221. In an embodiment, the second active material layer 223 may be coated on one surface of the second collector 221. The first active material layer 213 may be coated on both surfaces of the first collector 211. In an embodiment, the first active material layer 213 may be coated on one surface of the first collector 211.

The first collector 211 and the second collector 221 that may be metal thin films may include one or more of stainless steel, Ni, copper (Cu), aluminium (Al), or an alloy thereof. For example, the first collector 211 may include Al or an Al alloy and the second collector 221 may include Cu or a Cu alloy.

The first active material layer 213 may include a positive electrode active material. The positive electrode active material may include a lithium containing oxide. In an embodiment, any positive electrode active material may be used. The second active material layer 223 may include a negative electrode active material. The negative electrode active material may include one or more of carbon (C), graphite, or silicon (Si). In an embodiment, any negative electrode active material may be used.

In the above-described first and second electrodes 210 and 220, the first electrode 210 may be a positive electrode and the second electrode 220 may be a negative electrode. In an embodiment, the first electrode 210 may be the negative electrode and the second electrode 220 may be the positive electrode. The first collector 211 may include Cu or the Cu alloy and an active material layer including the negative electrode active material may be formed in the first collector 211. The second collector 221 may include Al or the Al alloy and an active material layer including the positive electrode active material may be formed in the second collector 221.

The separator 230 may be an insulating thin film having ion transmissivity and mechanical strength. The separator 230 may be provided between the first electrode 210 and the second electrode 220 to prevent electrical short from being generated between the first electrode 210 and the second electrode 220 during charge and discharge and to let ions move. The separator 230 may have the same shape as or a similar shape to those of the first collector 211 and the second collector 221. In an embodiment, the separator 230 may be larger than the first collector 211 and the second collector 221, and it may be possible to prevent an edge of the first electrode 210 and an edge of the second electrode 220 from being shorted.

The separator 230, for example, may be a thin film in which a plurality of fine through holes are formed and may include polyethylene (PE), polypropylene (PP), polyolefin resin, or an equivalent thereof.

The at least one electrode tab may include the first electrode tab 260 and the second electrode tab 270. According to the current embodiment, a case in which the at least one electrode tab includes the first electrode tab 260 and the second electrode tab 270 is described in detail. In an embodiment, only one electrode tab may be provided. For example, the first electrode 210 may be electrically connected to the first electrode tab 260 and the second electrode 220 having opposite polarity to that of the first electrode 210 may directly contact the can 20 and 30, and the can 20 and 30 may function as the electrode terminal. In an embodiment, the secondary battery may include at least one electrode tab connected to one of the first electrode 210 and the second electrode 220 of the electrode assembly 200.

Referring to FIG. 5, the first electrode tab 260 may be a conductive plate-shaped member having predetermined width and length. The first electrode tab 260 may overlap the first electrode 210 and may be electrically connected to the first electrode 210. For example, the first electrode tab 260 may include a tab overlapping unit 261 stacked on the first collector 211 and a tab extending unit 263 that may extend from the tab overlapping unit 261 to the outside of the electrode assembly 200. The tab overlapping unit 261 may be fixed to the non-coated portion of the first collector 211, for example, the portion that is not coated with the first active material layer 213. The first electrode 210 to which the first electrode tab 260 is fixed may be sequentially stacked with the separator 230 and the second electrode 220 and may be rolled, and the tab overlapping unit 261 may overlap the first electrode 210 and the separator 230.

The first electrode tab 260 may be fixed to the first collector 211 by welding. An approximately rectangular welding region 262 may be formed in a center of the tab overlapping unit 261 and may be connected to the non-coated portion of the first collector 211 by welding. An edge of the tab overlapping unit 261 may not be welded to the first collector 211. In the portion in which the tab overlapping unit 261 and the tab extending unit 263 are connected, the welding region 262 may be formed to a boundary between the tab overlapping unit 261 and the tab extending unit 263. In an embodiment, a size and a shape of the welding region 262 may vary. The welding region 262 may be elliptical unlike in FIG. 5 and may be separated from the boundary between the tab overlapping unit 261 and the tab extending unit 263.

The second electrode tab 270 may be a conductive plate-shaped member having predetermined width and length. In an embodiment illustrated in FIG. 4, the second electrode tab 270 and the first electrode tab 260 have the same shape. In an embodiment, the second electrode tab 270 may be longer or shorter than the first electrode tab 260 and may have a different width from that of the first electrode tab 260.

The second electrode tab 270 may overlap the second electrode 220 and may be electrically connected to the second electrode 220. The second electrode tab 270 may be fixed to the non-coated portion of the second collector 221 by welding. Like in the first electrode tab of FIG. 5, the second electrode tab 270 may include a tab overlapping unit stacked on the non-coated portion of the second collector 221 and a tab extending unit that may extend from the tab overlapping unit of the second electrode tab 270 to the outside of the electrode assembly 200.

A welding region may be formed in a center of the tab overlapping unit of the second electrode tab 270 and may be connected to the non-coated portion of the second collector 221. An edge of the tab overlapping unit of the second electrode tab 270 may not be welded to the non-coated portion of the second collector 221. A shape of the welding region formed in the tab overlapping unit of the second electrode tab 270 may be the same as or may be different from that of the welding region 262 of the first electrode tab 260. Positions, shapes, or the number of welding regions of the first and second electrode tabs 260 and 270 may vary in accordance with materials or welding methods of the first and second electrode tabs 260 and 270 and the first and second collectors 211 and 221.

The electrode assembly 200 further may include a buffer layer 240 and an adhesive layer 250. Referring to FIGS. 4 to 6, the buffer layer 240 may be stacked between the tab overlapping unit 261 of the first electrode tab 260 and the first collector 211 to release stress applied to the electrode assembly 200. The buffer layer 240 may be a thin film member of which plane shape may be square and may at least partially overlap the edge of the tab overlapping unit 261 in which the welding region 262 is not formed.

Referring to FIG. 5, the buffer layer 240 may overlap a longitudinal edge of the tab overlapping unit 261 according to an embodiment. The edge of the tab overlapping unit 261 that may overlap the buffer layer 240 may be positioned on an opposite side to, e.g., may be position on a side opposite to, a portion in which the tab overlapping unit 261 is connected to the tab extending unit 263 of the first electrode tab 260. Hereinafter, between both longitudinal ends of the tab overlapping unit 261 of the first electrode tab 260, an end that is connected to (or that forms a boundary with) the tab extending unit 263 of the first electrode tab 260 is referred to as a connection end and an end that overlaps the buffer layer 240 is referred to as an overlapping end.

The buffer layer 240 may not overlap the welding region 262 of the tab overlapping unit 261 of the first electrode tab 260. A part of a center of the buffer layer 240 may be covered with the overlapping end of the tab overlapping unit 261. The buffer layer 240 may extend to the outside of the first electrode tab 260 in a portion in which the buffer layer 240 overlaps the first electrode tab 260. In FIGS. 4 and 5, a shape of the buffer layer 240 may be a rectangle that may extend by a predetermined length. In an embodiment, the buffer layer 240 may have any shape capable of releasing the stress applied to the first collector 211 and the first electrode tab 260 such as an ellipse, a semi-circle, and a circle.

The adhesive layer 250 formed of an adhesive material may fix the buffer layer 240 to the first electrode 210. For example, the adhesive layer 250 may have the same shape and size as the buffer layer 240 and may be stacked between the buffer layer 240 and the non-coated portion of the first collector 211. The adhesive layer 250 may include a conductive material. The adhesive layer 250 may not have the same size and shape as the buffer layer 240 and may have any shape capable of fixing the buffer layer 240 to the first collector 211 and may be smaller than the buffer layer 240.

The buffer layer 240 may include a polymer base layer as an example. The adhesive layer 250 may be coated on the polymer base layer. The buffer layer 240 and the adhesive layer 250 may be formed by attaching a polymer tape to the first collector 211.

The buffer layer 240 may include a metal base layer as another example. The adhesive layer 250 may be coated on the metal base layer. The buffer layer 240 and the adhesive layer 250 may be formed by attaching a metal thin film tape to the first collector 211. The metal base layer may include at least one of Ni, Cu, and Al.

The polymer base layer or the metal base layer may not be attached in the form of a tape and may be attached to the adhesive layer 250 after forming the adhesive layer 250 by coating an adhesive material on the non-coated portion of the first collector 211.

According to the current embodiment, the buffer layer 240 may be fixed to the first collector 211, for example, by the adhesive layer 250. In an embodiment, the adhesive layer 250 may not be provided. For example, the buffer layer 240 may be fixed to the first collector 211 or the first electrode tab 260 by welding, which may be applied to a modification of the buffer layer 240 to be described later.

In the tab overlapping unit 261 of the first electrode tab 260, although the overlapping end that may cover the buffer layer 240 may not be directly fixed to the buffer layer 240, the overlapping end may be pressed toward the first collector 211 in a state in which the tab overlapping unit 261 is welded to the first collector 211, the overlapping end may be adhered to the buffer layer 240 by force by which the overlapping end may be pressed toward the first collector 211 and may be fixed to the buffer layer 240. In the tab overlapping unit 261 of the first electrode tab 260 and the buffer layer 240, portions in which the tab overlapping unit 261 of the first electrode tab 260 and the buffer layer 240 overlap may be fixed by welding.

The buffer layer 240 may be modified to disperse and release the stress applied to the first electrode tab 260 and the first collector 211. FIGS. 7 to 15 illustrate modifications 240', 240", 244, 245, and 247 of the buffer layer 240. Referring to FIGS. 7 to 15, the modifications 240', 240", 244, 245, and 247 of the buffer layer 240 will be described in detail.

The buffer layer 240' may include a pair of side buffer layers 242 and 243 that respectively may overlap both edges of the first electrode tab 260 in a width direction. The buffer layer 240' may be provided between the tab overlapping unit 261 of the first electrode tab 260 and the first collector 211 so as to overlap the both edges of the tab overlapping unit 261 in the width direction.

Figure 7:
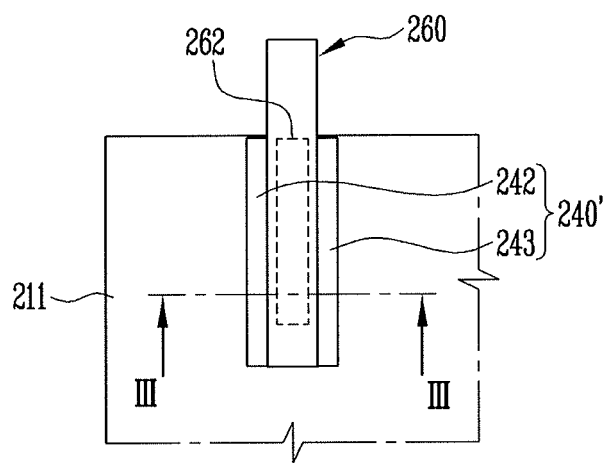
FIG. 7 illustrates an enlarged plan view of the portion A according to an embodiment.
Figure 8:
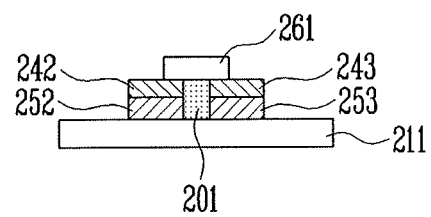
FIG. 8 illustrates a cross-sectional view taken along the line of FIG. 7.

Referring to FIGS. 7 and 8, the pair of side buffer layers 242 and 243 may be arranged not to overlap the welding region 262 of the first electrode tab 260. The pair of buffer layers 242 and 243 may respectively be arranged on both sides of a welding connection unit 201 formed between the welding region 262 of the first electrode tab 260 and the first collector 211. In FIG. 8, the welding connection unit 201 and the side buffer layers 242 and 243 may contact each other. In an embodiment, a gap may exist between the welding connection unit 201 and the side buffer layers 242 and 243. The buffer layer 240 of FIG. 5 may contact a welding connection unit formed between the welding region 262 of the first electrode tab 260 and the first collector 211 and may be slightly separated from the welding connection unit, and a gap may exist between the buffer layer 240 and the welding connection unit.

The pair of side buffer layers 242 and 243 may be thin film members that may extend by a length approximately equal to that of the tab overlapping unit 261 of the first electrode tab 260 and that may have a predetermined width. The pair of side buffer layers may be formed to be longer or shorter and shapes of the pair of side buffer layers may be modified.

Each of the pair of side buffer layers 242 and 243 may include a polymer base layer or a metal base layer. Adhesive layers 252 and 253 may be respectively provided between the pair of side buffer layers 242 and 243 and the first collector 211, and the pair of side buffer layers 242 and 243 may be attached to the first collector 211. Like in the above-described embodiment, the buffer layer 240' may be connected to the first collector 211 by welding or may not be directly connected to the first collector 211.

Figure 9:
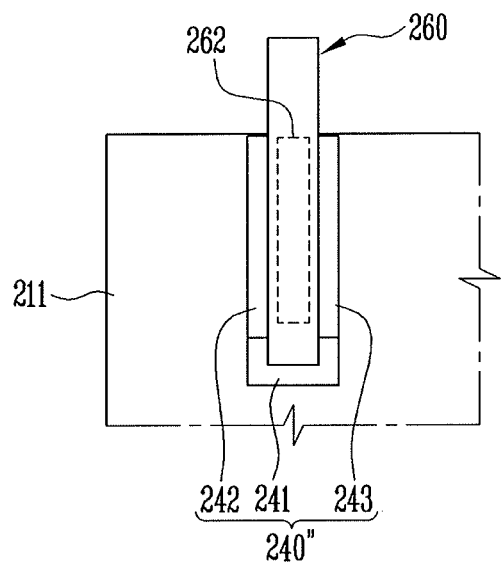
FIG. 9 illustrates an enlarged plan view of the portion A according to an embodiment.

The buffer layer 240" may overlap the both edges of the tab overlapping unit 261 of the first electrode tab 260 and an edge of the overlapping end. Referring to FIG. 9, the buffer layer 240" may include an end buffer layer 241 and the pair of side buffer layers 242 and 243.

The end buffer layer 241 may be arranged to overlap an overlapping end in a longitudinal end of the first electrode tab 260 like the buffer layer 240 described with reference to FIGS. 5 and 6. The pair of side buffer layers 242 and 243 may be arranged to overlap the both edges of the first electrode tab 260 in the width direction like the buffer layer 240' described with reference to FIGS. 7 and 8.

The pair of side buffer layers 242 and 243 may extend to longitudinal both ends of the tab overlapping unit 261 of the first electrode tab 260 according to the embodiment of FIG. 7, and the pair of side buffer layers 242 and 243 may extend from an extension end (as described above, the extension end means a boundary between the tab overlapping unit 261 and the tab extending unit 263) of the tab overlapping unit 261 of the first electrode tab 260 to the end buffer layer 241 according to the embodiment of FIG. 9.

The buffer layer 240" may be fixed to the first collector 211 by the adhesive layer or by welding like the buffer layer 240 of FIG. 5, may be fixed to the first electrode tab 260 by welding, or may be indirectly pressed and fixed to the first electrode tab 260 while the welding region 262 of the first electrode tab 260 is welded.

In the buffer layer 240" of FIG. 9, the end buffer layer 241 and the pair of side buffer layers 242 and 243 may be separate members. In an embodiment, the buffer layer 240" may be formed of one member in which the end buffer layer 241 and the pair of side buffer layers 242 and 243 are connected.

In an embodiment in which the buffer layer 240" is formed of one member in which the buffer layer 240" entirely overlaps the edge of the tab overlapping unit 261 of the first electrode tab 260, the buffer layer 240" may be formed of an approximately U-shaped thin film having a predetermined width. The U shape may be angular or round to correspond to a shape of an edge of the first electrode tab 260. An internal edge of the buffer layer 240" may be formed to surround the welding region 262 of the first electrode tab 260 and an external edge of the buffer layer 240" may be formed to be larger than an outside edge of the first electrode tab 260, and a part including an inside of the buffer layer 240" may overlap the edge of the first electrode tab 260. The external edge of the buffer layer may extend to an edge of the first non-coated portion or may be separated from the edge of the first non-coated portion.

Figure 10:
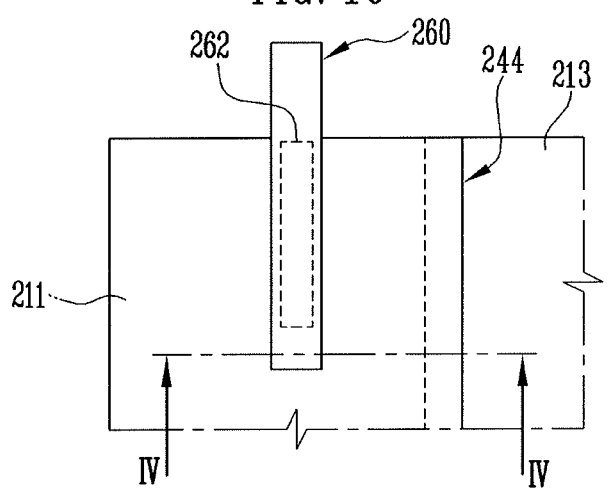
FIG. 10 illustrates an enlarged plan view of the portion A according to an embodiment.
Figure 11:
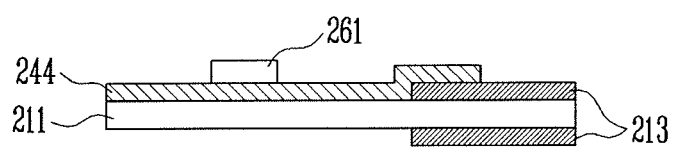
FIG. 11 illustrates a cross-sectional view taken along the line IV-IV of FIG. 10.

In an embodiment in which a buffer layer 244 is formed of an approximately U-shaped member, an external edge of the buffer layer 244 may further extend to partially overlap the first active material layer 213. Referring to FIGS. 10 and 11, the embodiment in which the buffer layer 244 is formed to overlap the first active material layer 213 will be described in detail.

The buffer layer 244 may be an integrated thin film member provided between the first electrode tab 260 and the first collector 211 and may be formed to extend from the outside of the welding region 262 of the first electrode tab 260 to an external edge of the welding region 262 of the first electrode tab 260 to cover the first non-coated portion. The buffer layer 244 may extend from the outside of the welding region 262 beyond an edge of the first active material layer 213 and may overlap the edge of the first electrode tab 260 and the edge of the first active material layer 213.

An adhesive layer may be further provided between the buffer layer 244 and the first collector 211. An adhesive layer may also be further provided between the buffer layer 244 and the first active material layer 213.

Figure 12:
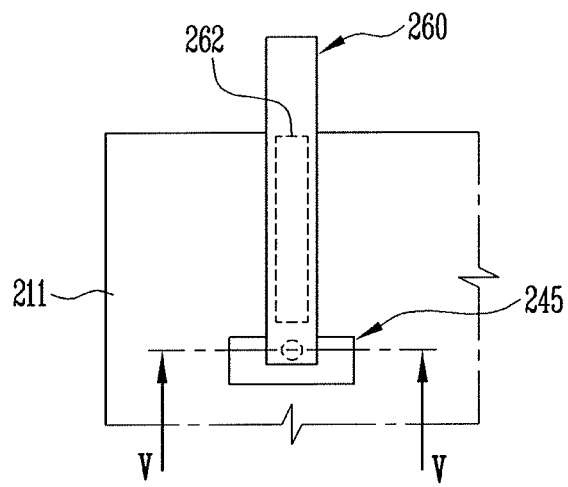
FIG. 12 illustrates an enlarged plan view of the portion A according to an embodiment.
Figure 13:
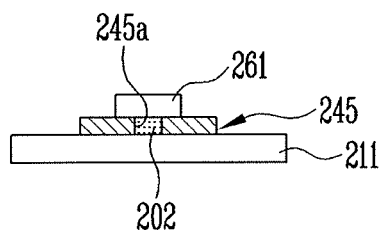
FIG. 13 illustrates a cross-sectional view taken along the line V-V of FIG. 12.

FIGS. 12 and 13 illustrate a buffer layer 245 according to an embodiment. The buffer layer 245 may be a rectangular thin film member in which a through hole 245a may be formed. The buffer layer 245 may be arranged to overlap the extension end of the first electrode tab 260 like the buffer layer 240 of FIG. 5. The through hole 245a of the buffer layer 245 also may overlap the first electrode tab 260.

A welding connection unit 202 formed by welding the first electrode tab 260 and the first collector 211 may be provided in the through hole 245a of the buffer layer 245. The first electrode tab 260 may be connected to the first collector 211 by welding through the through hole 245a of the buffer layer 245 as well as connected to the first collector 211 by welding in the welding region 262. A periphery of the through hole 245a may be pressed by the first electrode tab 260, the buffer layer 245 may be fixed to the first collector 211, and the buffer layer 245 may be indirectly fixed to the first collector 211 without the adhesive layer.

In a modification of the buffer layer 245, like that the buffer layer 240" of FIG. 9 may be integrally formed, the buffer layer 245 may be formed of an approximately U-shaped thin film, and the buffer layer 245 may entirely overlap the edge of the tab overlapping unit 261 of the first electrode tab 260. The through hole 245a may be formed in a portion covered with the overlapping end of the first electrode tab 260. A periphery of the welding region 262 of the first electrode tab 260 may press the buffer layer 245 toward the first collector 211, and the buffer layer 245 may be fixed to the first collector 211. Force by which the first electrode tab 260 may press the buffer layer 245 may be maintained by welding the welding region 262 of the first electrode tab 260 to the first collector 211 and by welding the first electrode tab 260 to the first collector 211 through the through hole 245a.

The buffer layers 240, 240', 240", 244, and 245 according to the above-described embodiments may be provided between the first electrode tab 260 and the first non-coated portion. In an embodiment, the buffer layer 247 according to an embodiment may be provided on an opposite side to the first electrode tab 260.

Figure 14:
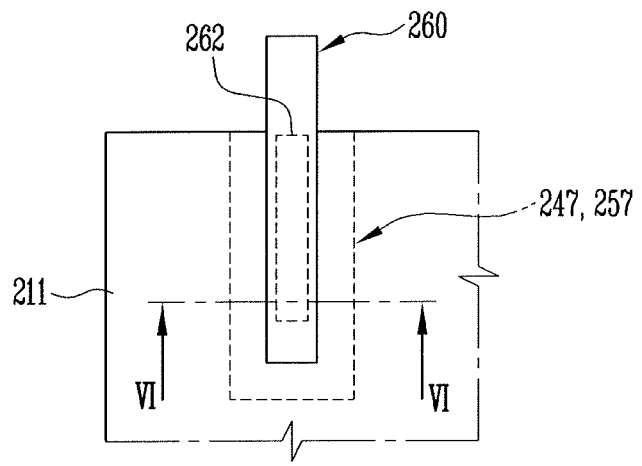
FIG. 14 illustrates an enlarged plan view of the portion A according to an embodiment.
Figure 15:
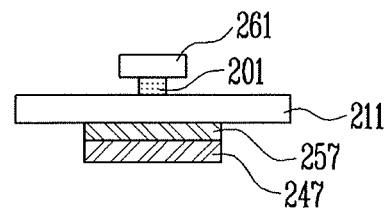
FIG. 15 illustrates a cross-sectional view taken along the line IV-IV of FIG. 14.

Referring to FIGS. 14 and 15, the buffer layer 247 may be provided in the non-coated portion of the first collector 211 on an opposite side to a portion to which the first electrode tab 260 is attached. The buffer layer 247 may be a rectangular thin film member, may entirely overlap the tab overlapping unit 261 of the first electrode tab 260, and may be formed to be larger than the tab overlapping unit 261.

In the first electrode tab 260, the welding region 262 may be formed in the center of the tab overlapping unit 261 and the welding connection unit 201 may be formed between the first collector 211 and the first electrode tab 260. According to the current embodiment, the buffer layer 247 may be provided on the opposite to the first electrode tab 260, and the buffer layer 247 may overlap the welding region 262.

An adhesive layer 257 may further be provided between the buffer layer 247 and the first collector 211, and the buffer layer 247 may be fixed to the first collector 211. A detailed configuration of the adhesive layer 257 may be the same as that of the adhesive layer 250 of FIG. 6, and detailed description thereof will not be given.

The buffer layers 240, 240', 240", 244, 245, and 247 according to the above-described modifications may include polymer base layers or metal base layers and detailed configurations thereof may be the same as that of the buffer layer 240 of FIG. 5, and detailed description thereof will not be given.

The electrode assembly 200 according to an embodiment may further include a cover layer. The electrode assembly 200 including the cover layer will be described in detail with reference to FIGS. 16 to 22. The same elements as those of the above-described embodiments are denoted by the same reference numerals and detailed description thereof will not be given.

Figure 16:
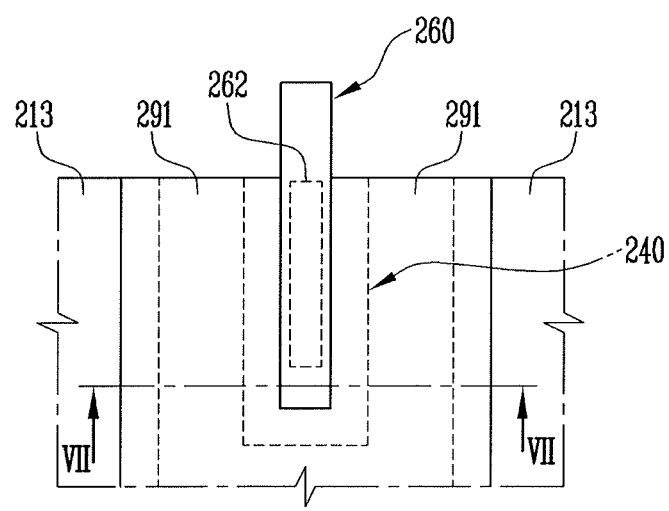
FIG. 16 illustrates a partially enlarged plan view of an electrode tab attached to an electrode assembly and a periphery thereof according to an embodiment.

FIG. 16 illustrates a plan view of the first electrode 210 including a cover layer 291 arranged to cover the first electrode tab 260. FIG. 17 illustrates a cross-sectional view taken along the line VII-VII of FIG. 16. In FIG. 16, a buffer layer may be one of the above-described buffer layers 240, 240', and 240" and detailed description of the buffer layer will not be given. The buffer layer 245 of FIG. 12 may be applied to the embodiment shown in in FIG. 17.

The cover layer 291 may be arranged to entirely cover the tab overlapping unit 261 of the first electrode tab 260, the buffer layers 240, 240', and 240", and at least the edge of the first active material layer 213. A width of the cover layer 291 may be equal to or smaller than that of the first collector 211. The cover layer 291 may longitudinally extend, and a longitudinal edge of the cover layer 291 may overlap the edge of the first active material layer 213.

The cover layer 291 may be formed of an insulating material. An adhesive layer may further be provided between the cover layer 291 and the first electrode 210, and the cover layer 291 may be fixed to the first electrode 210. The cover layer 291 may be a tape formed of polypropylene (PP).

Figure 18:
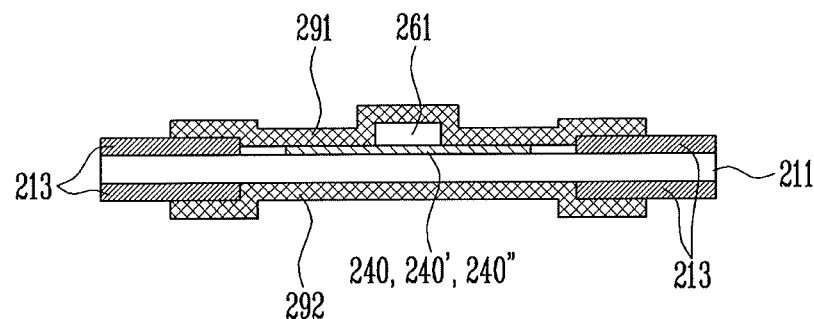
FIG. 18 illustrates a cross-sectional view taken along the line VII-VII of an embodiment in which a cover layer is added to FIG. 16.

FIG. 18 illustrates a cross-sectional view taken along the line VII-VII of an embodiment in which a cover layer is added to FIG. 16 so that a plurality of cover layers 291 and 292 are provided. The electrode assembly 200 according to the embodiment of FIG. 18 may include the plurality of cover layers 291 and 292. One 291 of the plurality of cover layers 291 and 292 may have the same configuration as described with reference to FIGS. 16 and 17 and the remaining cover layer 292 may be arranged to cover the first non-coated portion and at least the edge of the first active material layer 213 on the opposite side to the first electrode tab 260. According to the current embodiment, for convenience sake, the cover layer that covers the first electrode tab 260 is referred to as a first cover layer and the cover layer provided on the opposite side to the first electrode tab 260 is referred to as a second cover layer.

The second cover layer may have the same shape as the first cover layer and may be arranged in the same way. The second cover layer may be formed of an insulating material and an adhesive layer may further be provided between the second cover layer and the first electrode 210, and the second cover layer may be fixed to the first electrode 210. The second cover layer may be a tape formed of polypropylene (PP). A size of the second cover layer may be different from that of the first cover layer.

Figure 19:
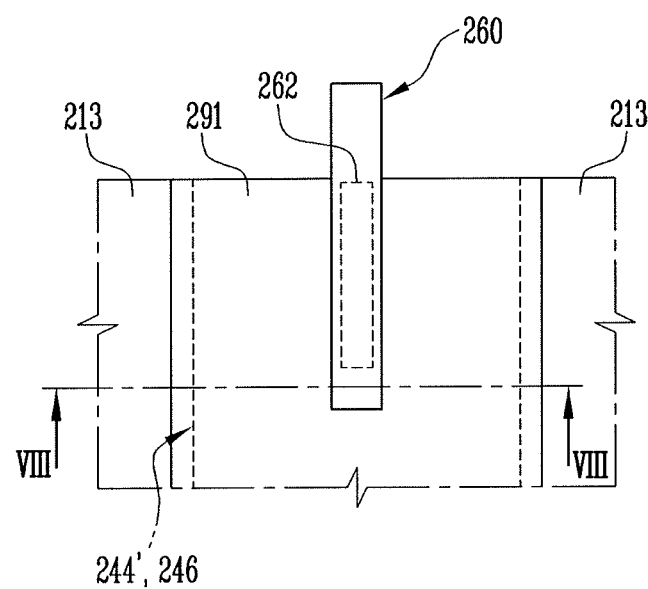
FIG. 19 illustrates a partially enlarged plan view of an embodiment in which a modification of a buffer layer is applied to FIG. 16.
Figure 20:
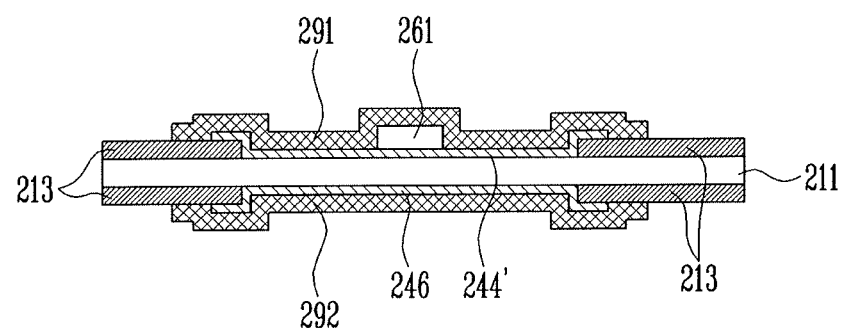
FIG. 20 illustrates a cross-sectional view taken along the line VIII-VIII of FIG. 19.

FIG. 19 illustrates a partial plan view of the first electrode 210 including a plurality of buffer layers and a plurality of cover layers. FIG. 20 illustrates a cross-sectional view taken along the line VIII-VIII of FIG. 19. The plurality of buffer layers include a first buffer layer 244' provided between the first electrode tab 260 and the first electrode 210 and a second buffer layer 246 provided in the first electrode 210 on an opposite side to the first buffer layer 244'.

An edge of the first buffer layer 244' may extend beyond the edge of the first active material layer 213 like the buffer layer 244 of FIG. 10. In FIG. 19, the first active material layer 213 may be formed on both sides of the first non-coated portion and the buffer layer 244' may extend so that both edges of the buffer layer 244' may longitudinally overlap the first active material layer 213 on the both sides of the first non-coated portion.

The second buffer layer 246 may be provided on an opposite side to the first buffer layer 244' and may entirely cover the first non-coated portion. The second buffer layer 246 may extend beyond the first active material layer 213 so that both edges of the second buffer layer 246 may longitudinally overlap edges of the first active material layer 213 on the both sides of the first non-coated portion. A width of the second buffer layer 246 may be equal to that of the first collector 211. In an embodiment, the width of the second buffer layer 246 may be shorter than that of the first collector 211.

Shapes of outside edges of the first buffer layer 244' and the second buffer layer 246 may be the same. In an embodiment, the shapes of the outside edges of the first buffer layer 244' and the second buffer layer 246 may be different from each other. For example, the size of the second buffer layer 246 in length and width directions may be smaller than that of the first buffer layer 244'.

The plurality of cover layers may include a first cover layer 294 that may cover the first electrode tab 260 and the first buffer layer 244' and a second cover layer 296 that may cover the second buffer layer 246. The first cover layer 294 may be formed to be larger than the first buffer layer 244' and both edges of the first cover layer 294 may longitudinally extend more than the both edges of the first buffer layer 244', and the first buffer layer 244' may be entirely covered with the first cover layer 294 to the edge thereof and the edge of the first cover layer 294 may contact the first active material layer 213.

The second cover layer 296 may be provided in the first electrode 210 on an opposite side to the first cover layer 294. The second cover layer 296 may be formed to be larger than the second buffer layer 246 to entirely cover the second buffer layer 246 and may longitudinally extend more than the second buffer layer 246. A shape of an outside edge of the second cover layer 296 may be the same as that of the first cover layer 294. The second cover layer 296 may have any shape and size by which the second cover layer 296 may cover the second buffer layer 246. The shape and size of the second cover layer 296 may be different from those of the first cover layer 294.

Widths of the plurality of cover layers 294 and 296 may be equal to that of the first collector 211. In an embodiment, the widths of the plurality of cover layers 294 and 296 may be smaller than that of the first collector 211. In an embodiment, the widths of the plurality of cover layers 294 and 296 may be equal to or larger than those of the first and second buffer layers 244' and 246.

The plurality of cover layers 294 and 296 may be formed of an insulating material like the cover layer 291 of FIG. 16 and detailed description thereof will not be given.

Figure 21:
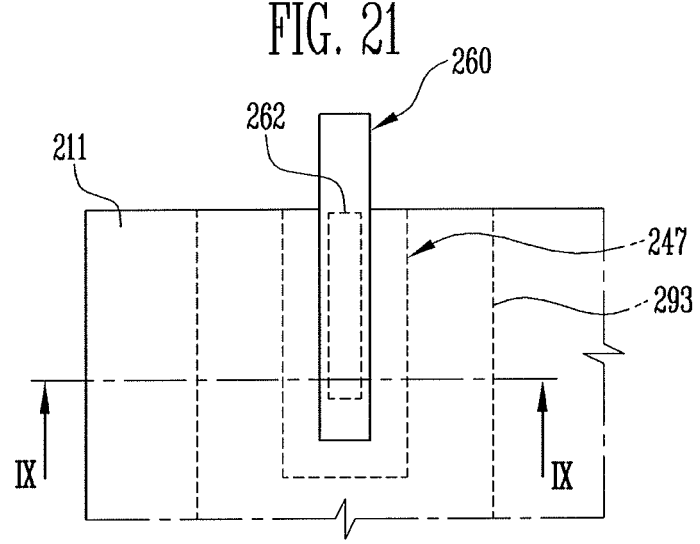
FIG. 21 illustrates an enlarged plan view of the portion A according to an embodiment.
Figure 22:
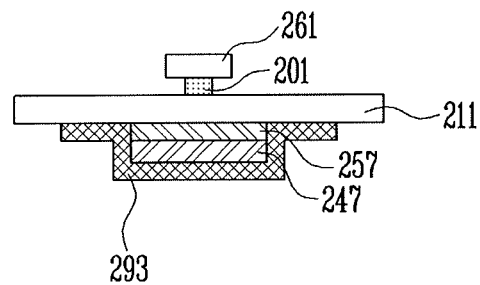
FIG. 22 illustrates a cross-sectional view taken along the line IX-IX of FIG. 21.

When only one cover layer is provided in the first electrode 210, unlike in FIG. 16, the cover layer may be provided on an opposite side to the first electrode tab 260, which will be described in detail with reference to FIGS. 21 and 22. FIG. 21 illustrates a partial plan view of an embodiment in which a cover layer 293 is further provided in the first electrode 210 of FIG. 14. FIG. 22 illustrates a cross-sectional view taken along the line IX-IX of FIG. 21. The same elements as those of FIGS. 14 and 15 are denoted by the same reference numerals and detailed description thereof will not be given.

The cover layer 293 may be provided in the first non-coated portion to entirely cover the buffer layer 247. The cover layer 293 may longitudinally extend more than the buffer layer 247 to cover the buffer layer 247 and to partially cover the first non-coated portion. In FIG. 21, the cover layer 293 partially covers the first non-coated portion. In an embodiment, the cover layer 293 may entirely cover the first non-coated portion and may extend more to cover the edge of the first active material layer 213.

The cover layers 293, 294, and 296 according to the various embodiments may be formed of an insulating material like the cover layer 291 of FIG. 16 and detailed description thereof will not be given.

The buffer layers 240, 240', 240", 244, 245, and 247 according to the above-described modifications may be provided not in the first electrode 210 but in the second electrode 220. A detailed configuration may be understood by having the respective elements of the first electrode 210 correspond to the respective elements of the second electrode 220 in the embodiments described above with reference to FIGS. 1 to 22.

A secondary battery according to an embodiment may include a case 100 and 300, an electrode assembly 200, and at least one electrode tab 260'. The case 100 and 300 and the electrode assembly 200 may be the same as described with reference to FIGS. 1 to 5. The secondary battery may be obtained by modifying the at least one electrode tab in the above-described embodiment, and description of repeated configuration will not be given and the at least one electrode tab 260' will be described in detail.

Figure 23:
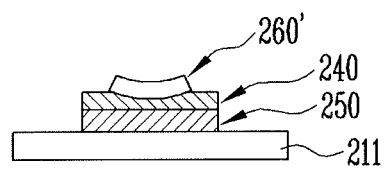
FIG. 23 illustrates a cross-sectional view taken along the line II-II of an embodiment in which a modification of an electrode tab is applied to FIG. 1.

The at least one electrode tab 260' may be a first electrode tab 260. FIG. 23 illustrates a cross-sectional view taken along the line II-II of an embodiment of the first electrode tab 260 of FIG. 5 with a modified shaped. Referring to FIG. 23, the electrode tab 260' may be formed by longitudinally extending a curved surface having a curvature in a width direction. In the electrode tab 260', a surface toward the first collector 211 may be convex and an opposite surface may be concave. The above-described buffer layer 240 and adhesive layer 250 may be arranged between the convex surface of the electrode tab 260' and the first collector 211 like in the embodiment described in detail with reference to FIG. 5.

The electrode tab 260' may not have the shape of the first electrode tab 260 but may have the shape of the second electrode tab 270. All the first electrode tab 260 and the second electrode tab 270 may be formed like the electrode tab 260' of FIG. 23. The buffer layer 240 provided between the electrode tab 260' and the first collector 211 may be formed like the buffer layers 240', 240", 244, 245, and 247 according to the modifications.

A secondary battery according to an embodiment may include the case 20 and 30, the electrode assembly 200, and the first and second electrode tabs 260 and 270. In the above-described embodiments, the buffer layer is illustrated as being provided in the first electrode or the second electrode. In the current embodiment, the buffer layer may be provided in both the first electrode and the second electrode. The electrode assembly 200 may further include insulating tapes 260*a* and 270*a*. An embodiment will be described in detail with reference to FIG. 24. The same elements as those of the above-described embodiment are denoted by the same reference numerals and detailed description thereof will not be given.

Figure 24:
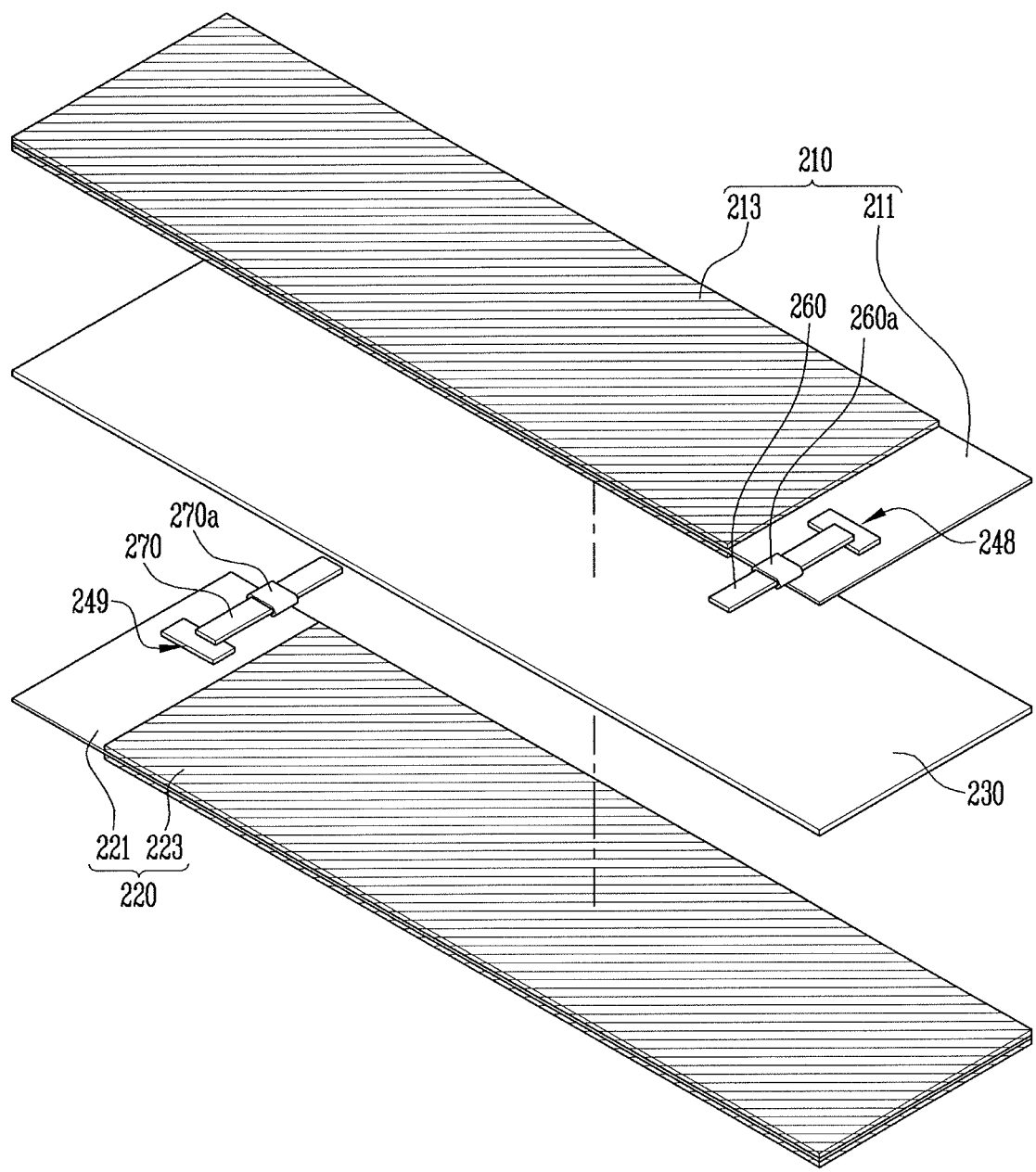
FIG. 24 illustrates a perspective view of an electrode assembly according to an embodiment.

Referring to FIG. 24, the insulating tapes 260*a* and 270*a* respectively may be provided in the first and second electrode tabs 260 and 270. For example, the first insulating tape 260*a* provided in the first electrode tab 260 may be an insulating band member that may surround a boundary between the tab overlapping unit 261 and the tap extending unit 263 of the first electrode tab 260. The second insulating tape 270*a* provided in the second electrode tab 270 may be an insulating band member that may surround a boundary between the tab overlapping unit and the tap extending unit of the second electrode tab 270. Short of the electrode tabs 260 and 270 may be prevented by the insulating tapes 260*a* and 270*a* and heat generated by the electrode tabs 260 and 270 may be blocked by the insulating tapes 260*a* and 270*a*.

The electrode assembly 200 may include a pair of buffer layers 248 and 249. The pair of buffer layers 248 and 249 may include the first buffer layer 246 provided in the first electrode 210 and the second buffer layer 247 provided in the second electrode 220. The electrode assembly 200 may be the same as the above-described embodiment excluding that the buffer layers 248 and 249 respectively may be provided in the electrodes 210 and 220, and described description thereof will not be given. The buffer layers 248 and 249 have the same shape as the buffer layer of FIG. 5. In an embodiment, the buffer layers 240', 240", 244, 245, and 247 according to the above-described modifications may also be applied.

Figure 25:
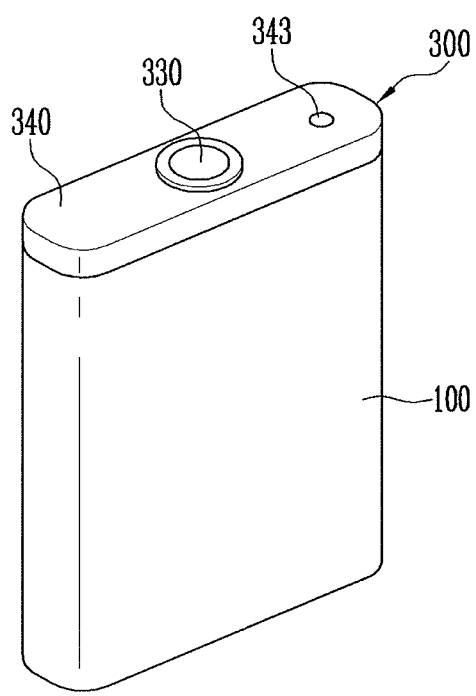
FIG. 25 illustrates a perspective view of a secondary battery according to an embodiment.
Figure 26:
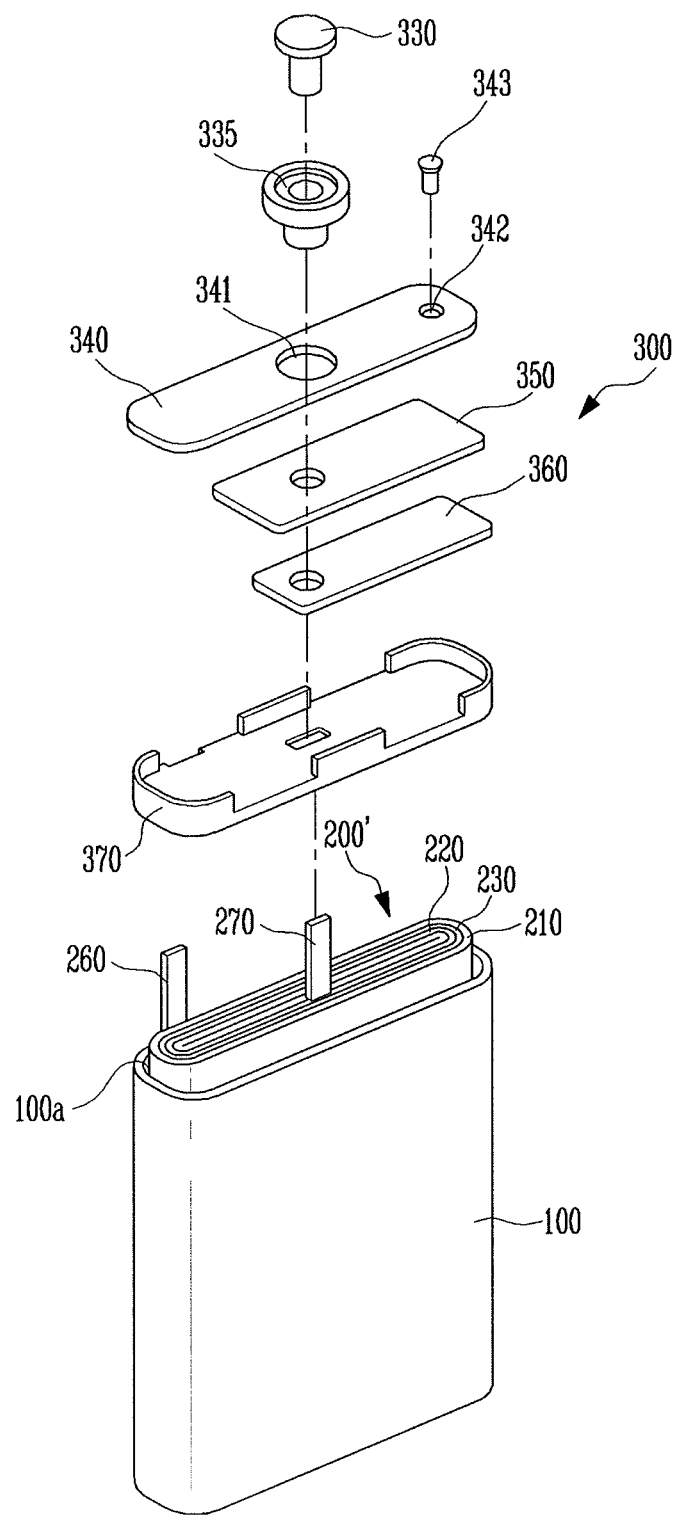
FIG. 26 illustrates an exploded perspective view of the secondary battery of FIG. 25.
Figure 27:
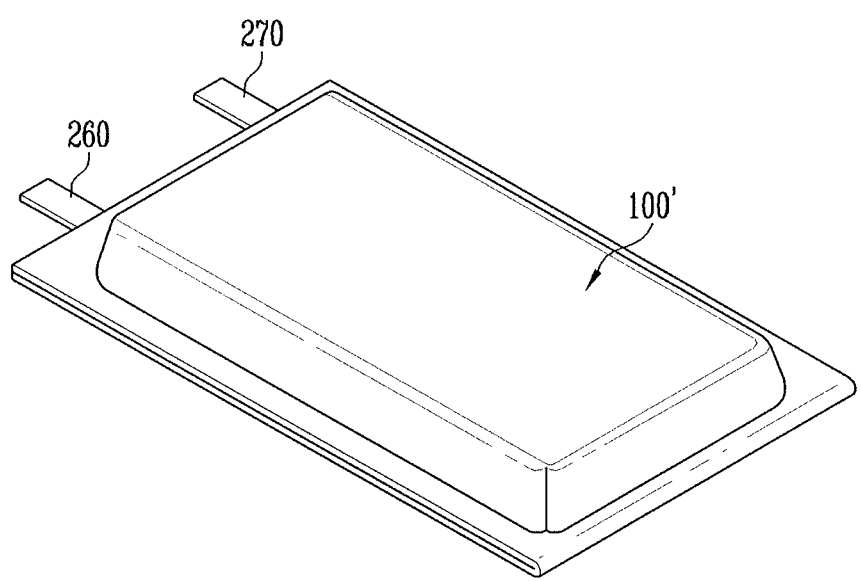
FIG. 27 illustrates a perspective view of a secondary battery according to an embodiment.

In an embodiment, an electrode assembly 200' may be accommodated in the approximately rectangular case 100 and 300. FIG. 25 illustrates a perspective view of a secondary battery according to an embodiment and FIG. 26 illustrates an exploded perspective view of the secondary battery of FIG. 25.

The electrode assembly 200' may be rolled, a cross-section thereof may be a flat ellipse, and may be accommodated in the rectangular case 100 and 300. The first electrode tab 260 and the second electrode tab 270 may extend from the same side to the outside of the electrode assembly 200'. In the current embodiment, the shape of the case 100 and 300 and the shape of the cross-section of the electrode assembly 200' may be modified in comparison with the embodiments described with reference to FIGS. 1 to 24. The same elements as those of the above-described embodiment are denoted by the same reference numerals and description thereof will not be given.

In the current embodiment, the buffer layers 240, 240', 240", 244, 245, and 247 according to the embodiment of FIG. 5 and the modifications may be applied and detailed description thereof will not be given.

The case 100 and 300 may include a can 100 of which one end may be opened and a cap assembly 300 for sealing up the opening of the can 100. The can 100 may be an approximately rectangular member in which a space may be formed and an opening 100a may be formed in one surface. The opening 100a may correspond to a portion in which the electrode tab of the electrode assembly 200' may protrude. The can 100 may be formed of a metal and may function as an electrode terminal.

The cap assembly 300 may include a cap plate 340, an insulating plate 350, a terminal plate 360, and an electrode terminal 330. The cap assembly 300 may be insulated from the electrode assembly 200' by an insulating case 370 and may be combined with the opening 100a to seal up the can 100.

The cap plate 340 may be a metal plate having a size and a shape corresponding to those of the opening 100a. A terminal through hole 341 may be formed in the center of the cap plate 340 and the electrode terminal 330 may be inserted into the terminal through hole 341. A tube-shaped gasket 335 may be provided between the electrode terminal 330 and the terminal through hole 341. The gasket 335 for insulating the electrode terminal 330 from the cap plate 340 may be combined with an external surface of the electrode terminal 330 and may be inserted into the terminal through hole 341 together with the electrode terminal 330. The electrode terminal 330 may be electrically connected to the first electrode 210 through the first electrode tab 260 and may function as the first electrode 210.

An electrolyte injecting hole 342 may be formed in the cap plate 340. A vent may be further formed. The vent may be integrally formed by reducing a thickness of a cross-section of the cap plate 340. When the cap assembly 300 is combined with the can 100, an electrolyte may be injected into the electrolyte injecting hole 342 and the electrolyte injecting hole 342 may be sealed up by a cover 343.

According to an embodiment, the electrode assembly 200' may be accommodated in a pouch-shaped case 100'. In the current embodiment, the case 100' may be modified to be pouch-shaped in comparison with the above-described embodiment. A configuration and a function of the electrode assembly 200' may be the same as the above-described embodiment, and the same elements are denoted by the same reference numerals and detailed description thereof will not be given.

The case 100' may be a member that may surround the electrode assembly 200' and may include a first sub-case 117 and a second sub-case 118. In the first sub-case 117, an accommodating unit 117a that may be a space for accommodating the electrode assembly 200' may be formed. The second sub-case 118 may be implemented to cover the first sub-case 117, and the accommodating unit 117a may be provided to correspond to a shape and a size of the electrode assembly 200'. For example, the accommodating unit 117a may be manufactured by a deep drawing process in which a hollow container is manufactured without a joint on a flat plate.

The secondary battery according to the current embodiment may be manufactured by accommodating the electrode assembly 200' and an electrolyte in the accommodating unit 117a and thermosetting an edge 117b of the first sub-case 117 and an edge 118b of the second sub-case 118 in a state in which the first sub-case 117 and the second sub-case 118 may adhere to each other, and a sealing unit 112 may be formed. The pair of electrode tabs 260 and 270 may extend to the outside of the case 100' through the sealing unit 112.

Figure 28:
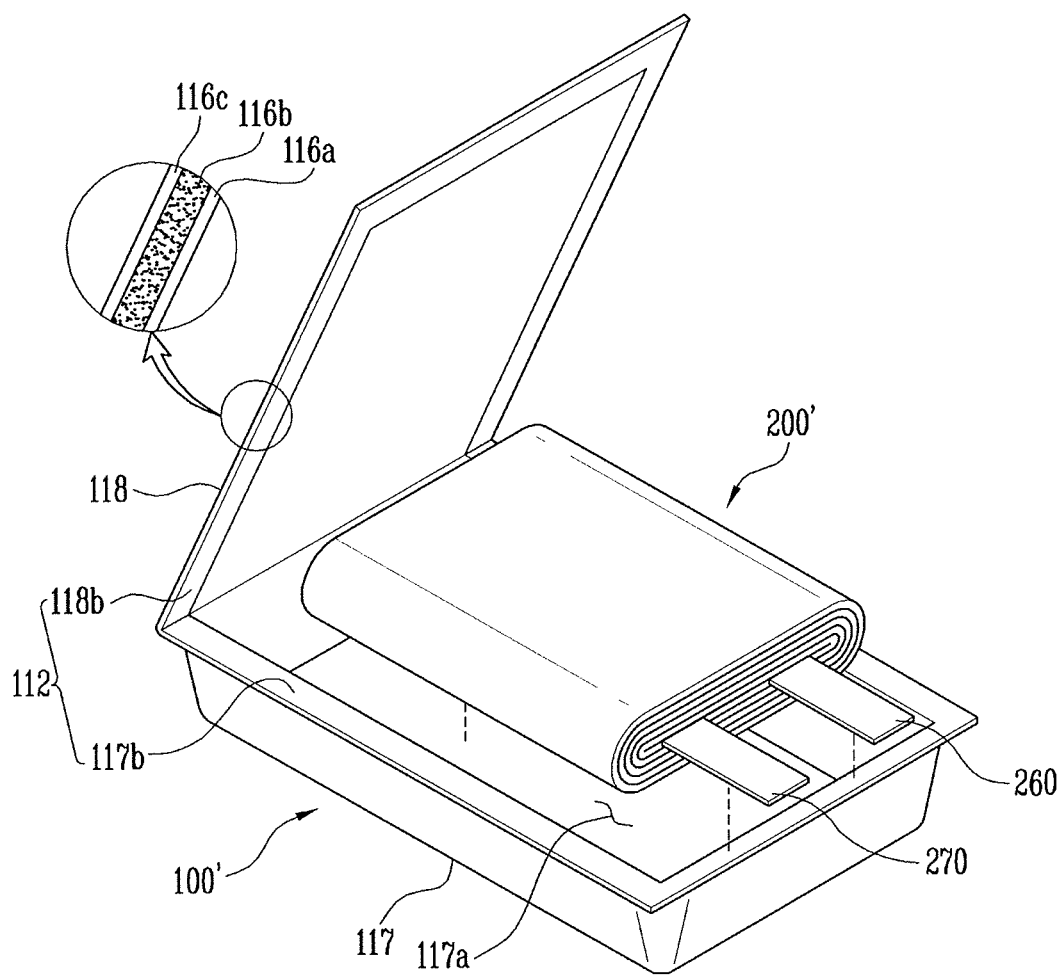
FIG. 28 illustrates an exploded perspective view of the secondary battery of FIG. 27.

Referring to FIG. 28, the case 100' may sequentially include an internal resin layer 116a, a metal layer 116b, and an external resin layer 116c. The internal resin layer 116a may directly face the electrode assembly 200'. The external resin layer 116c may correspond to the outermost surface of the case 100'. The internal resin layer 116a and the external resin layer 116c may be formed of polymer resin that may be an electrical non-conductor to prevent a short. The metal layer 116b may be provided between the internal resin layer 116a and the external resin layer 116c to provide predetermined mechanical strength to the case 100'. For example, the metal layer 116c may include aluminium (Al).

Figure 29:
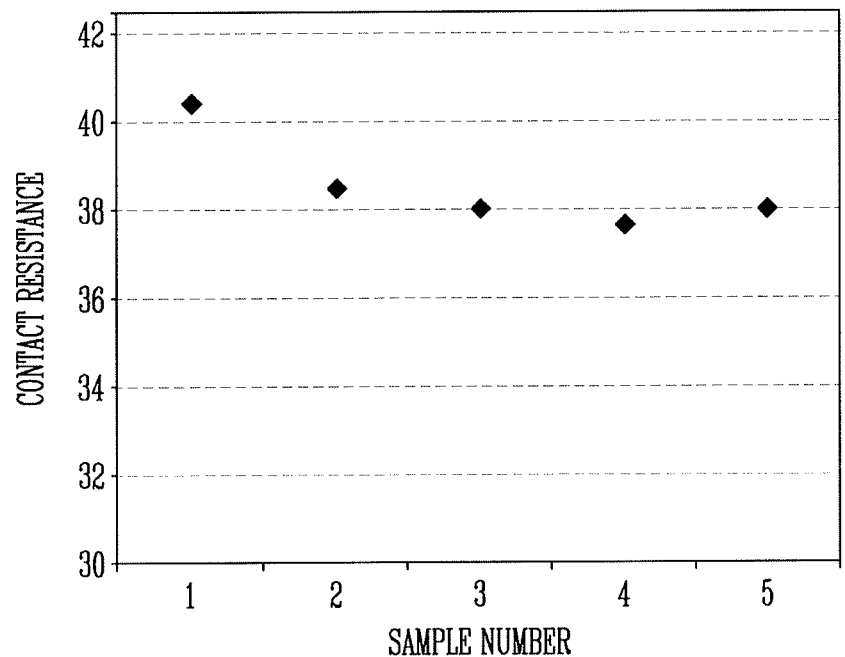
FIG. 29 illustrates a graph of results of measuring contact resistances of various embodiments.
Figure 30:
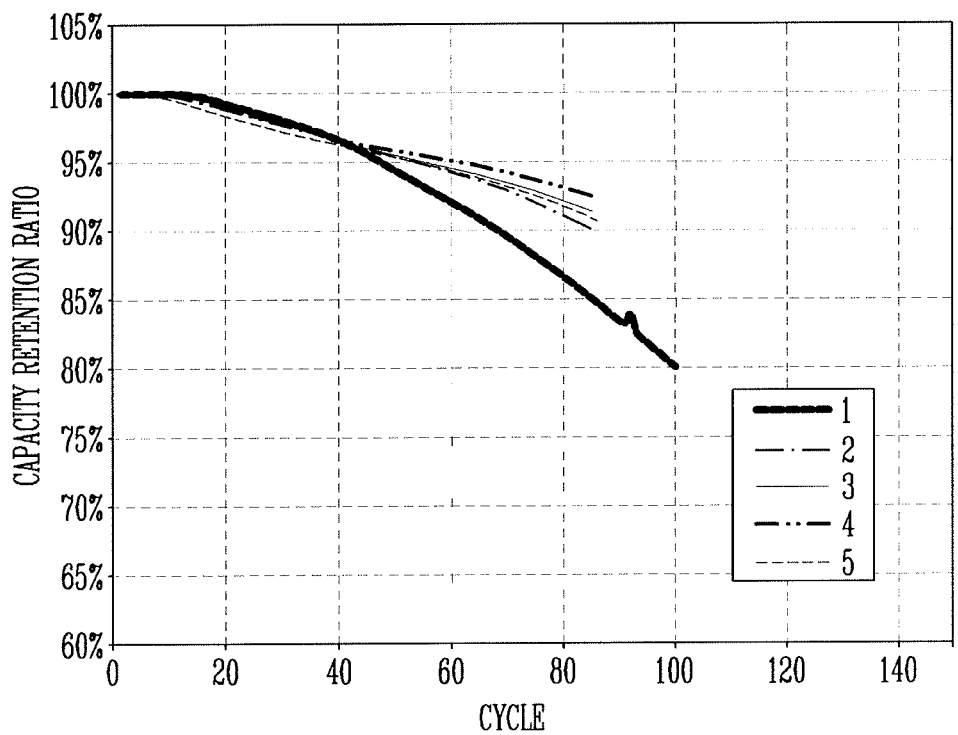
FIG. 30 illustrates a graph of results of measuring capacity retention ratios of various embodiments.

FIG. 29 illustrates a graph of results of measuring contact resistances of various embodiments. FIG. 30 illustrates a graph of results of measuring capacity retention ratios of various embodiments. Referring to FIGS. 29 and 30, effects obtained when the buffer layer 240 of FIG. 5 was provided in a negative electrode and a positive electrode will be described in detail.

In FIGS. 29 and 30, sample 1 was a secondary battery including an electrode assembly without the buffer layer 240, in sample 2, the buffer layer 240 including the polymer base layer was provided in the negative electrode of a secondary battery, in sample 3, the buffer layer 240 including the polymer base layer was provided in the positive electrode of a secondary battery, in sample 4, the buffer layer 240 including the metal base layer was provided in the negative electrode of a secondary battery, and, in sample 5, the buffer layer 240 including the metal base layer was provided in the positive electrode of a secondary battery.

The graph of FIG. 29 displays sample numbers on the x axis and displays contact resistance DC IR values measured in the respective samples. A unit of resistance is ma Referring to FIG. 29, in the case of the roll-type electrode assembly without the buffer layer, the contact resistance was larger than 40 mΩ. However, when the buffer layer was provided in the negative electrode and the positive electrode like in samples 2 to 5, stress applied to the electrode assembly was released, and the contact resistance was reduced to about 38 mΩ.

The graph of FIG. 30 displays the number of recharge cycles on the x axis and displays to what % an initial battery capacity was maintained with increase in the recharge cycles by the respective samples on the y axis. Referring to FIG. 30, in the case of the roll-type electrode assembly without the buffer layer, when the number of recharges passed 40, a tendency toward reduction in a capacity retention ratio increased. However, in samples 2 to 5, a tendency toward reduction in capacity retention ratios of the batteries was almost uniformly maintained until the recharge cycles passed 80.

In sample 1, when the recharge cycle was 80, a capacity of the battery was reduced to about 87% of an initial capacity. However, in samples 2 to 5, when the recharge cycle was 80, a capacity of the battery was maintained as about 90% to 95% of an initial capacity, and durability of the secondary battery including the buffer layer improves and a lifespan of the secondary battery including the buffer layer increased.

By way of summation and review, an embodiment relates to a secondary battery with improved durability. According to embodiments, durability of the portion in which the electrode tab and the electrode are connected may be improved.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly including:
a pair of electrodes having opposite polarities, and
a separator between the pair of electrodes; and
at least one electrode tab electrically connected to one of the pair of electrodes, the at least one electrode tab extending outside of the electrode assembly, wherein:
the electrode assembly further includes a buffer layer between at least one electrode tab and the one of the pair of electrodes, and
the buffer layer includes a through hole, the through hole having a closed-loop shape and being between the at least one electrode tab and the one of the pair of electrodes, wherein:
a welding region connected to the one of the pair of electrodes is in at least a part of the at least one electrode tab,
the buffer layer is by the welding region between the at least one electrode tab and the one of the pair of electrodes,
the through hole of the buffer layer is in a portion in which the buffer layer overlaps the at least one electrode tab and is spaced from the welding region, and
the at least one electrode tab and the one of the pair of electrodes are connected via the through hole.

2. The secondary battery as claimed in claim 1, wherein the at least one electrode tab includes:
a tab overlapping portion overlapping the one of the pair of electrodes; and
a tab extending portion extending from the tab overlapping portion to outside of the electrode assembly,
wherein the buffer layer at least partially overlaps an edge of the tab overlapping portion.

3. The secondary battery as claimed in claim 2, wherein the buffer layer overlaps a longitudinal end of the tab overlapping portion.

4. The secondary battery as claimed in claim 2, wherein the buffer layer overlaps an end in a width direction of the tab overlapping portion.

5. The secondary battery as claimed in claim 2, wherein the buffer layer extends from the edge of the tab overlapping portion to an edge of an active material layer of the one of the pair of electrodes such that the buffer layer covers a lateral surface and a top surface of the edge of the active material layer of the one of the pair of electrodes.

6. The secondary battery as claimed in claim 2, wherein a height of the tab overlapping portion from a top surface of the one of the pair of electrodes is greater than a height of the tab extending portion from the top surface the one of the pair of electrodes.

7. The secondary battery as claimed in claim 1, further comprising an adhesive layer between the one of the pair of electrodes with the buffer layer and the buffer layer, wherein the adhesive layer overlaps at least a part of the buffer layer.

8. The secondary battery as claimed in claim 7, wherein the adhesive layer has conductivity.

9. The secondary battery as claimed in claim 1, further comprising a cover layer on the one of the pair of electrodes so as to cover the buffer layer.

10. The secondary battery as claimed in claim 9, wherein the cover layer includes an insulating tape.

11. The secondary battery as claimed in claim 1, wherein the one of the pair of electrodes includes at least one of graphite and silicon.

12. The secondary battery as claimed in claim 1, wherein the buffer layer includes a metal base layer.

* * * * *